(12) United States Patent
Jang et al.

(10) Patent No.: US 10,135,889 B2
(45) Date of Patent: *Nov. 20, 2018

(54) MULTIPLE SUBSCRIBER VIDEOCONFERENCING SYSTEM

(71) Applicant: Margalla Communications, Inc., Woodside, CA (US)

(72) Inventors: Saqib Jang, Woodside, CA (US); Mark Kent, Los Altos Hills, CA (US)

(73) Assignee: Margalla Communications, Inc., Woodside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,023

(22) Filed: Jul. 11, 2016

(65) Prior Publication Data

US 2016/0337418 A1 Nov. 17, 2016

Related U.S. Application Data

(63) Continuation of application No. 14/929,586, filed on Nov. 2, 2015, now Pat. No. 9,419,939, which is a
(Continued)

(51) Int. Cl.
*H04L 12/16* (2006.01)
*H04L 29/06* (2006.01)
(Continued)

(52) U.S. Cl.
CPC ........ *H04L 65/403* (2013.01); *H04L 12/1813* (2013.01); *H04L 29/06* (2013.01);
(Continued)

(58) Field of Classification Search
None
See application file for complete search history.

(56) References Cited

U.S. PATENT DOCUMENTS 5,585,839 A * 12/1996 Ishida .................. H04M 3/567
348/14.09
5,657,246 A * 8/1997 Hogan .................. H04N 7/142
348/14.01
(Continued)

OTHER PUBLICATIONS

Ridgeway Systems & Software, Ridgeway VX-System Deployment, Version 3.1, 1999-2001, (38 pages).
(Continued)

*Primary Examiner* — Phirin Sam
(74) *Attorney, Agent, or Firm* — The Noblitt Group, PLLC

(57) ABSTRACT

A system, method, and device for use in videoconferencing. The method typically includes installing a videoconferencing services switch at an access point to an IP network, and registering a plurality of subscribers for videoconferencing services. Each subscriber typically has a plurality of endpoints. The method further includes receiving subscriber-specific settings to be applied to multiple videoconferencing calls from the plurality of endpoints associated with each subscriber. The method further includes storing the subscriber-specific settings at a location accessible to the switch, and configuring the switch to connect calls from the plurality of endpoints at each subscriber based on the corresponding subscriber-specific settings.

29 Claims, 10 Drawing Sheets

Related U.S. Application Data continuation of application No. 14/638,754, filed on Mar. 4, 2015, now Pat. No. 9,253,444, which is a continuation of application No. 13/865,190, filed on Apr. 18, 2013, now Pat. No. 9,154,734, which is a continuation of application No. 11/236,121, filed on Sep. 26, 2005, now Pat. No. 8,665,759, which is a continuation of application No. 09/819,548, filed on Mar. 26, 2001, now Pat. No. 6,980,526.

(60) Provisional application No. 60/191,819, filed on Mar. 24, 2000.

(51) Int. Cl.
  H04L 12/18        (2006.01)
  H04L 29/12        (2006.01)
  H04Q 11/04        (2006.01)
  H04N 7/15         (2006.01)
  H04W 8/18         (2009.01)

(52) U.S. Cl.
  CPC .... H04L 29/12009 (2013.01); H04L 29/1233 (2013.01); H04L 29/12047 (2013.01); H04L 61/15 (2013.01); H04L 61/25 (2013.01); H04L 61/2503 (2013.01); H04L 61/256 (2013.01); H04L 63/0272 (2013.01); H04L 63/0428 (2013.01); H04L 65/1006 (2013.01); H04L 65/4038 (2013.01); H04N 7/15 (2013.01); H04Q 11/04 (2013.01); H04W 8/183 (2013.01); H04L 29/06027 (2013.01); H04L 63/0281 (2013.01); H04L 63/164 (2013.01); H04Q 2213/1329 (2013.01); H04Q 2213/13034 (2013.01); H04Q 2213/13103 (2013.01); H04Q 2213/13106 (2013.01); H04Q 2213/13109 (2013.01); H04Q 2213/13166 (2013.01); H04Q 2213/13196 (2013.01); H04Q 2213/13204 (2013.01); H04Q 2213/13335 (2013.01); H04Q 2213/13337 (2013.01); H04Q 2213/13339 (2013.01); H04Q 2213/13348 (2013.01); H04Q 2213/13389 (2013.01); H04Q 2213/13399 (2013.01)

(56) References Cited

U.S. PATENT DOCUMENTS

| | | | |
|---|---|---|---|
| 5,796,424 A | * | 8/1998 | Ely .................. H04Q 11/0478 348/14.1 |
| 5,867,653 A | | 2/1999 | Aras et al. |
| 5,872,922 A | * | 2/1999 | Hogan .................. H04N 7/142 348/14.03 |
| 5,903,302 A | | 5/1999 | Browning et al. |
| 5,999,966 A | | 12/1999 | McDougall et al. |
| 6,006,253 A | | 12/1999 | Kumar |
| 6,025,870 A | | 3/2000 | Hardy et al. |
| 6,078,810 A | | 6/2000 | Olds et al. |
| 6,112,233 A | | 8/2000 | Xu |
| 6,128,649 A | * | 10/2000 | Smith .................. H04N 7/152 348/14.03 |
| 6,167,445 A | | 12/2000 | Gai et al. |
| 6,188,687 B1 | | 2/2001 | Mussman et al. |
| 6,233,234 B1 | | 5/2001 | Curry et al. |
| 6,262,978 B1 | | 7/2001 | Bruno et al. |
| 6,324,279 B1 | | 11/2001 | Kalmanek, Jr. et al. |
| 6,330,022 B1 | | 12/2001 | Seligmann |
| 6,346,963 B1 | | 2/2002 | Katsumi |
| 6,363,053 B1 | | 3/2002 | Schuster et al. |
| 6,373,850 B1 | | 4/2002 | Lecourtier et al. |
| 6,404,746 B1 | | 6/2002 | Cave et al. |
| 6,433,813 B1 | | 8/2002 | Forkner et al. |
| 6,442,141 B1 | | 8/2002 | Borella et al. |
| 6,442,169 B1 | | 8/2002 | Lewis |
| 6,449,260 B1 | | 9/2002 | Sassin et al. |
| 6,473,421 B1 | | 10/2002 | Tappan |
| 6,529,513 B1 | | 3/2003 | Howard et al. |
| 6,532,218 B1 | | 3/2003 | Shaffer et al. |
| 6,563,793 B1 | | 5/2003 | Ghahremani |
| 6,584,093 B1 | | 6/2003 | Salama |
| 6,590,604 B1 | | 7/2003 | Tucker et al. |
| 6,614,781 B1 | | 9/2003 | Elliott et al. |
| 6,625,258 B1 | | 9/2003 | Ram et al. |
| 6,640,239 B1 | | 10/2003 | Gidwani |
| 6,671,262 B1 | | 12/2003 | Kung et al. |
| 6,680,943 B1 | | 1/2004 | Gibson |
| 6,714,987 B1 | | 3/2004 | Amin et al. |
| 6,754,181 B1 | * | 6/2004 | Elliott .................. H04L 12/66 370/252 |
| 6,757,259 B1 | | 6/2004 | Hamilton |
| 6,757,732 B1 | | 6/2004 | Sollee et al. |
| 6,771,639 B1 | | 8/2004 | Holden |
| 6,778,645 B1 | | 8/2004 | Rao |
| 6,795,106 B1 | | 9/2004 | Cooper |
| 6,798,786 B1 | | 9/2004 | Lo et al. |
| 6,839,734 B1 | | 1/2005 | Vega-Garcia et al. |
| 6,850,985 B1 | | 2/2005 | Giloi et al. |
| 6,859,448 B1 | * | 2/2005 | Roy .................. H04L 29/06027 370/338 |
| 6,885,658 B1 | | 4/2005 | Ress et al. |
| 6,909,708 B1 | | 6/2005 | Krishnaswamy et al. |
| 7,023,867 B1 | * | 4/2006 | Park .................. H04M 7/006 370/353 |
| 7,088,706 B2 | | 8/2006 | Zhang et al. |
| 7,113,992 B1 | * | 9/2006 | Even .................. H04N 7/148 348/E7.082 |
| 7,260,060 B1 | | 8/2007 | Abaye et al. |
| 7,822,188 B1 | | 10/2010 | Kirchhoff et al. |
| 8,254,404 B2 | | 8/2012 | Rabenko et al. |
| 9,419,939 B2 | * | 8/2016 | Jang .................. H04L 12/1813 |
| 2001/0050918 A1 | | 12/2001 | Surprenant et al. |
| 2002/0071026 A1 | | 6/2002 | Agraharam et al. |
| 2002/0099854 A1 | | 7/2002 | Jorgensen |
| 2002/0187777 A1 | | 12/2002 | Osterhout et al. |
| 2003/0007069 A1 | * | 1/2003 | Forkner .................. H04N 7/15 348/14.08 |
| 2003/0058836 A1 | | 3/2003 | Even |
| 2004/0010616 A1 | * | 1/2004 | McCanne .......... H04L 12/1836 709/238 |
| 2004/0022237 A1 | | 2/2004 | Elliott et al. |
| 2005/0069101 A1 | | 3/2005 | Bear et al. |
| 2005/0094640 A1 | | 5/2005 | Howe |
| 2007/0053513 A1 | | 3/2007 | Hoffberg |
| 2008/0151873 A1 | | 6/2008 | Borsetti |
| 2012/0257527 A1 | | 10/2012 | Jorgensen |

OTHER PUBLICATIONS

Ridgeway Systems & Software, Ridgeway VX-System Getting Started, Version 3.1, 1999-2001, (50 pages).

Ridgeway Systems & Software, Ridgeway VX-System Management, Version 31, 1999-2001, (84 pages).

Ridgeway Systems & Software, Ridgeway VX-System Release Notes, Version 3.1, 1999-2001, (13 pages).

Ridgeway Systems & Software, Fact Sheet: VX-Centrex vs. CPE, Oct. 19, 1999, (1 page).

Ridgeway Systems & Software, Ridgeway VX Media Manager: Server software for the Ridgeway VX Communication System, Brochure, 2001, (2 pages).

Ridgeway Systems & Software, Ridgeway VX Server Family: Hardware for the Ridgeway VX Communication System, Brochure, 2001, (3 pages).

Ridgeway Systems & Software, "Ridgeway Announces New Hardware Platform to Facilitate Voice Over IP," article, May 18, 1999, 3 pages, CTP00006708-710.

Roe, S., "Web Conferencing: Security," presentation, Fall Forum—Keystone, Colorado, Nov. 1999, 30 pages, CTP00008323-52.

(56) References Cited

OTHER PUBLICATIONS

Ridgeway Systems & Software LTD, "Ridgeway VX-Centrex™: Broadband Multimedia Communications," 1999-2000, 2 pages, CTP00018207-8.
Davies, S. et al, Traversal of non-Protocol Aware Firewalls & NATS (CTP00001206), Internet Draft, Sep. 2001, (32 pages), Publisher: Internet Engineering Task Force.
Ridgeway Systems & Software, Next Generation IP Conferencing Services (CTP00001757), White Paper, 1999, (11 pages).
Ridgeway Systems & Software, Deploying IP-Based Conferencing Services (CTP00006368), 2001, (8 pages).
Ridgeway Systems & Software, Net Enhanced Telephony (CTP00006675), 1999, (13 pages).
Ridgeway Systems & Software, Product Description & Price List, Version 1.1 (CTP00006695), Jan. 2000, (13 pages).
Ridgeway Systems & Software, Ridgeway Announces New Hardware Platform to Facilitate Video Over IP (CTP00006708), Press Release, May 18, 1999, (3 pages).
Ridgeway Systems & Software, The IP Obstacle Course (CTP00008023), Apr. 2001, (18 pages).
Ridgeway Systems & Software, Product Vision (CTP00008051), White Papers, 1999, (2 pages).
Ridgeway Systems & Software, Fact Sheet: VX-Centrex vs. CPE (CTP00008281), Oct. 19, 1999, (1 page).
IMTC, Web Conferencing: Security (CTP00008323), Nov. 1999, (30 pages), Publisher: Fall Forum, Keystone, Colorado.
Unknown, V3.1 Development Status, Version 1 (CTP00008410), Nov. 28, 2000, (3 pages).
Ridgeway Systems & Software, netHance Server Management, Version 2.2 (CTP00008828), 2000, (71 pages).
Ridgeway Systems & Software, netHance Server Release Notes, Version 2.2 (CTP00008899), 2000, (9 pages).
Ridgeway Systems & Software, netHance Web Viewer Installation, Version 2.2 (CTP00008908), 2000, (6 pages).
Ridgeway Systems & Software, Ridgeway VX-Element Management, Version 11, 1999-2001, (37 pages).
International Telecommunication Union, "ITU-T H.323 Series H: Audiovisual and Multimedia Systems, Packet-based multimedia communications systems," ITU-T Recommendation H.323, Feb. 1998, (128 pages).
United States District Court for the Northern District of California, "Claims Construction Order," entered in *Cisco Systems, Inc.* v. *Teleconference Systems, LLC, et al.* pending in the USDC for the Northern Disctrict of California, civil action No. C 09-01550 JSW, Nov. 28, 2011, (14 pages).
Ridgeway Systems & Software, The IP Obstalce Course (CTP00008023), Apr. 2001, (18 pages).
Ridgeway Systems & Software, Product Vision (CTP00008051), White Papers, 1999, (2 pages).
IMTC, Web Conferencing: Security (CTP00008323, Nov. 1999, (30 pages), Publisher: Fall Forum, Keystone, Colorado.
Microsoft, "Virtual Private Networking: An Overview," whitepaper, 1999, (30 pages).
Ridgeway Systems & Software, Ridgeway VX-Centrex Network Deployment, Version 2.2 (CTP00008963), 2000, (26 pages).
Ridgeway Systems & Software, Ridgeway VX-Centrex Management, Version 2-2 (CTP00008995), 20000, (89 pages).
Ridgeway Systems & Software, netHance Server Management (CTP00018388), 2000, (51 pages).
Ridgeway Systems & Software, Ridgeway VX-Centrex Network Deployment (CTP00018500), 2000, (28 pages).
Ridgeway Systems & Software, Ridgeway VX-Centrex Management (CTP00018534), 2000, (89 pages).
Ridgeway Systems & Software, Ridgeway VX-System Management (CTP00018641 ), 2000, (89 pages).
Ridgeway Systems & Software, Deploying IP-Based Conferencing Services (Westo00004 ), 2001, (8 pages).
Ridgeway Systems & Software, Firewalls and H.323 How Ridgeway can help you overcome the issues (Westo00012), 2001, (2 pages).
Ridgeway Systems & Software, Firewall and NAT Traversal Methods, (Westo00014), 2001, (16 pages).
Ridgeway Systems & Software, Address Translation How Ridgeway can help you overcome the issues (Westo00041 ), 2001, (2 pages).
Ridgeway Systems & Software, Fact Sheet: VX-Centrex vs. CPE (Westo00077), 1999, (1 page).
Ridgeway Systems & Software, Ridgeway VX Media Manager (Westo00078), 2001, (2 pages).
Ridgeway Systems & Software, Ridgeway VX Server family (Westo00080), 2001, (3 pages).
Ridgeway Systems & Software, Ridgeway VX-Element Management (Westo00216), 1999-2001, (37 pages).
Ridgeway Systems & Software, Ridgeway VX-System Deployment (West000315), 1999-2001, (38 pages).
Ridgeway Systems & Software, Ridgeway VX-System Management (Westo00403), 2001, (84 pages).
Ridgeway Systems & Software, Ridgeway VX Centrex (CTP00018203), 1999-2000, (58 pages).
Cisco Systems, Inc., "Open PacketTelephony Architecture Session 1506," 1998, (41 pages).
Cisco Systems, Inc., "Advanced Enterprise Campus/WAN IP Telephony Design and Implementation Session 2006," 2000, (50 pages).
Cisco Systems, Inc., "Cisco AWID Product Update Session 2008," 2000, (33 pages).
Cisco Systems, Inc., "Video Over IP Product Update Session 2009," 2000, (29 pages).
Cisco Systems, Inc., "Introduction to IP Video Streaming and Conferencing Session 2010," 2000, (31 pages).
Cisco Systems, Inc., "IP Video Technologies—Deploying Video on Your Network Session 2011," 2000, (57 pages).
Cisco Systems, Inc., "Deploying Large Scale SP VoIP Networks Session 2014," 2000, (27 pages).
Cisco Systems, Inc., "Networking for E-Learning Session 3102," 2000, (23 pages).
Cisco Systems, Inc., "Multimedia Conference Manager with Voice Gateway Image with RSVP to ATM SVC Mapping," Nov. 2, 2000, (18 pages).
Cisco Systems, Inc., "Cisco Multimedia Conference Manager," 1999, (5 pages).
Cisco Systems, Inc., "Cisco Service Provider Business Voice Solution," 1992-2003, (12 pages).
Cisco Systems, Inc., "Troubleshooting IP Videoconferencing Session VVT-330," 1998, (31 pages).
Cisco Systems, Inc., "Introduction to IP Videoconferencing Technologies Session VVT-130," 2001, (29 pages).
Cisco Systems, Inc., "Deploying QoS for Voice and Video in IP Networks, Session VVT-213," 1998, (52 pages).
Cisco Systems, Inc., "Case Study: Cisco's IP Telephony Deployment, Session VVT-214," 1998 (40 pages).
Claims Construction Order, *Cisco Systems, Inc.* v. *Teleconference Systems, LLC et al.*, No. C 09-01550 JSW, United States District Court for the Northern District of California, Nov. 28, 2011, (14 pages).
Cisco Systems, Inc. "Networkers: Deploying Voice over IP in Campus Environments." Session 404. Cisco Systems, Inc. 1998, 1-42.
Cisco Systems, Inc., "Cisco Multimedia Conference Manager: Provides H.323 Gatekeeper and Proxy Services for Reliable and Scalable Videoconferencing and Voice-over-IP Deployments," Data Sheet, 1999, 5 pages, CTP00000926-30.
Cisco Systems, Inc., "Cisco Simplifies H.323 Multimedia Conferencing for Enterprises and Service Providers," article, Apr. 28, 1998, 2 pages, CTP00000939-40.
Cisco Systems, Inc., "H.323 Architecture and Design," presentation, 2000, 27 pages, CTP00000941-67.
Cisco Systems, Inc., "Multimedia Conference Manager," data sheet, Jul. 1, 2001, 4 pages, CTP00001066-69.
Kotha, Sam, "Deploying H.323 Applications in Cisco Networks," White Paper, 1998, 14 pages, CTP00001707-20.
Ridgeway Systems & Software, Ridgeway VX-System Cover Letter: Version 12 Cover Letter Issue 1, 1999-2001, (8 pages).
Ridgeway Systems & Software, Deploying IP-Based Conferencing Services, White Paper, 2001, (8 pages).

(56) References Cited

OTHER PUBLICATIONS

Ridgeway Systems & Software, Firewall and NAT Traversal Methods (An analysis for Voice and Video over IP), White Paper, 2001, (16 pages).
Ridgeway Systems & Software, Firewalls and H.323: How Ridgeway can help you overcome the issues Brochure, 2001, (2 pages).
Ridgeway Systems & Software, netHance Server Management, Version 3.1, 1999-2001, (85 pages).
Ridgeway Systems & Software, click-connect-communicate, Brochure, 2001, (2 pages).
Ridgeway Systems & Software, Ridgeway VX-System Programming Guide, Version 3.1, 2001, (28 pages).
Ridgeway Systems & Software, Ridgeway VX-Element Hardware Installation, Version 3.1, 1999-2001, (37 pages).
Ridgeway Systems & Software, Ridgeway VX-System Resources Installation, Version 3.1, 1999-2001, (23 pages).
Ridgeway Systems & Software, Ridgeway VX-System Software Upgrade and Reinstallation, Version 3.1, 1999-2001, (39 pages).

* cited by examiner

MULTIPLE SUBSCRIBER VIDEOCONFERENCING SYSTEM

CROSS REFERENCE TO RELATED APPLICATIONS

This application is a continuation of pending U.S. patent application Ser. No. 14/929,586 entitled "Multiple Subscriber Videoconferencing System" and filed Nov. 2, 2015, which is a continuation of pending U.S. patent application Ser. No. 14/638,754 entitled "Multiple Subscriber Videoconferencing System" and filed Mar. 4, 2015, which is a continuation of U.S. patent application Ser. No. 13/865,190 entitled "Multiple Subscriber Videoconferencing System" filed Apr. 18, 2013 and issued as U.S. Pat. No. 9,154,734 B2 on Oct. 6, 2015, which is a continuation of U.S. patent application Ser. No. 11/236,121 entitled "Multiple Subscriber Videoconferencing System" filed Sep. 26, 2005 and issued as U.S. Pat. No. 8,665,759 B2 on Mar. 4, 2014, which is a continuation of U.S. patent application Ser. No. 09/819,548 entitled "Multiple Subscriber Videoconferencing System" filed Mar. 26, 2001 and issued as U.S. Pat. No. 6,980,526 B2 on Dec. 27, 2005, which claims priority under 35 U.S.C. § 119(e) to U.S. Provisional Patent Application No. 60/191,819 entitled "System and Method for Security and Management of Streaming Data Communications on a Computer Network System," filed Mar. 24, 2000, the disclosures disclosure of which are hereby is herein incorporated by reference herein.

TECHNICAL FIELD

The present invention relates generally to videoconferencing, and more particularly to a system, method, and device for implementing a multiple subscriber videoconferencing service for use on Internet Protocol (IP) networks.

BACKGROUND OF THE INVENTION

Videoconferencing provides a convenient way for users in distant locations to participate in a face-to-face meeting, without having to spend time and money traveling to a central meeting site. Many prior videoconferencing systems have been based on circuit-switched Integrated Services Digital Networks (ISDN) standards. ISDN lines typically offer guaranteed quality of service, with specialized lines having high transmission rates. This enables high-quality video and audio signals to be delivered to the conferencing participants. However, ISDN videoconferencing is extremely expensive, because ISDN lines are costly to install and lease, and because specialized hardware is required at the sites of the users. Because of this expense, ISDN videoconferencing systems are typically offered in a specialized videoconferencing room, rather than at each desktop computer of each employee in an enterprise. In addition, ISDN can be complicated to set up, and unreliable. ISDN calls on average take more than 10 minutes to set-up, and greater than 10% of calls are dropped without being completed.

Recently, another approach to videoconferencing has emerged for use on packet-switched Internet Protocol (IP) networks, using the H.323 and Session Initiation Protocol (SIP) standards. H.323 is a standard approved by the International Telecommunication Union (ITU) in 1996 to promote compatibility in videoconference transmissions over IP networks. SIP is a proposed Internet Engineering Task Force (IETF) standard for multimedia communication over IP networks.

Videoconferencing over IP networks has a number of fundamental problems, including security, bandwidth utilization, quality of service, and deployment and management. Regarding security, H.323 and SIP are difficult to implement with current firewalls. The difficulty lies in the fact that H.323 and SIP are complex protocols and use multiple dynamically allocated ports for each call. Because of the heavy use of dynamically allocated ports, it is not possible to preconfigure firewalls to allow SIP- or H.323-signaled traffic without opening up large numbers of holes in the firewall. This represents a more lax firewall policy than would be acceptable at most enterprises. In addition, SIP or H.323 video endpoints behind a firewall typically cannot receive calls from external parties due to firewall policies in place at most enterprises.

Many enterprises also deploy Network Address Translation (NAT) devices, often implemented as part of a firewall application, to connect the enterprise network having private IP unregistered addresses to a public IP network with globally unique registered addresses. NAT is generally used for two purposes: 1) as a mechanism to work around the problem of IPv4 address space depletion, and 2) for security purposes (to hide internal IP addressing policy from outside entities. A NAT device rewrites IP headers as packets pass through the device. The NAT device maintains a table of mappings between IP addresses and port numbers. The problem with sending H.323 and SIP traffic through a NAT device is that these protocols make heavy use of embedded IP addresses, while normal data traffic contain IP address in the header of each packet. While configuring a NAT to rewrite packet headers to change addresses is relatively straightforward, it is very difficult to configure a NAT to translate addresses that are embedded in H.323 and SIP traffic, because the location of these address in these data stream is difficult to calculate.

Regarding bandwidth utilization, in order to achieve a quality sufficient for business videoconferencing, a minimum of 384 Kbps bandwidth is generally required per videoconferencing participant. Multiple users simultaneously engaged in videoconferencing applications may use up available bandwidth on a local area network (LAN), slowing down other critical network operations. Current systems do not allow a network administrator to control easily the bandwidth usage of multiple network users. Therefore, network administrators are reluctant to deploy videoconferencing systems.

Regarding quality of service, typical IP networks do not provide guaranteed transmission speeds for videoconferencing data. Videoconferencing data generally is indistinguishable from other data on IP networks, such as email and web page data. Data on IP networks may be delayed due to network congestion. While small delays are generally not a problem for less time sensitive data such as email, it can severely affect picture and audio quality for videoconference participants.

The above discussed issues lead to another problem with current videoconferencing systems, namely, that enterprises cannot easily outsource videoconferencing services to outside service providers. Currently, service providers are not able to cost-effectively provide videoconferencing services to a large number of subscribers, because specialized equipment must be deployed or existing equipment must be upgraded at every subscriber site. This results in an expensive up-front capital investment as well as significant operational expenses for the service provider. Up-front equipment installations take time at each subscriber, resulting in a slow deployment of the videoconferencing capabilities to subscribers. In addition, the high up-front costs result in decreased service provider profit margins. It is difficult to grow such a service because each subscriber adds to an incremental growth in the capital equipment pool because these resources are not shared.

Because of the cost and reliability issues with ISDN, and because of the security, bandwidth utilization, quality of service, and deployment and management issues with H.323 and SIP, it is difficult for the average enterprise to upgrade and customize its network to enable videoconferencing. In addition, it is difficult for service providers to cost-effectively provide an outsourced videoconferencing service on a per-subscriber basis. Thus there exists a need for a videoconferencing system, method, and device for delivering secure, high-quality videoconferencing services over an IP network to multiple enterprise subscribers in a manner that does not require expensive upgrading and customization of the enterprise network.

SUMMARY OF THE INVENTION

A system, method, and device for use in videoconferencing are provided. The method typically includes installing a videoconferencing switch at an access point to an IP network, and registering a plurality of subscribers for videoconferencing services. Each subscriber typically has a plurality of endpoints. The method further includes receiving subscriber-specific settings to be applied to multiple videoconferencing calls from the plurality of endpoints associated with each subscriber. The method further includes storing the subscriber-specific settings at a location accessible to the switch, and configuring the switch to connect calls from the plurality of endpoints at each subscriber based on the corresponding subscriber-specific settings.

According to another embodiment of the invention, the method may include installing a video services switch on a service provider network at an access point configured to enable multiple enterprise subscribers to access a global packet-switched computer network to exchange data, including videoconferencing data and non-videoconferencing data. The video services switch is typically configured to process videoconferencing data from multiple enterprise subscribers. The method further includes, at the video services switch, receiving a request for a videoconferencing call from an origination endpoint of one of the multiple enterprise subscribers, and connecting the videoconferencing call to a destination endpoint, the videoconferencing call having associated videoconferencing data. The method may further include securing the videoconferencing call based on subscriber-specific security settings.

The device typically includes a control plane module configured to receive subscriber-specific videoconferencing call settings for each of a plurality of video services subscribers, the videoconferencing call settings being for multiple calls placed from each video services subscriber, and a data plane module configured to receive videoconferencing data streams from multiple subscribers and manage these videoconferencing data streams according to the subscriber-specific videoconferencing call settings for each subscriber.

The system typically includes a service provider network configured to enable users of multiple enterprise subscriber networks to transfer data via a global computer network, the service provider network having an access point. The system also includes a videoconferencing services switch located on the access point of the service provider network. The videoconferencing services switch is configured to process videoconferencing calls from terminals on each of the multiple subscriber networks, based on subscriber-specific settings.

DETAILED DESCRIPTION OF THE INVENTION

Figure 1:
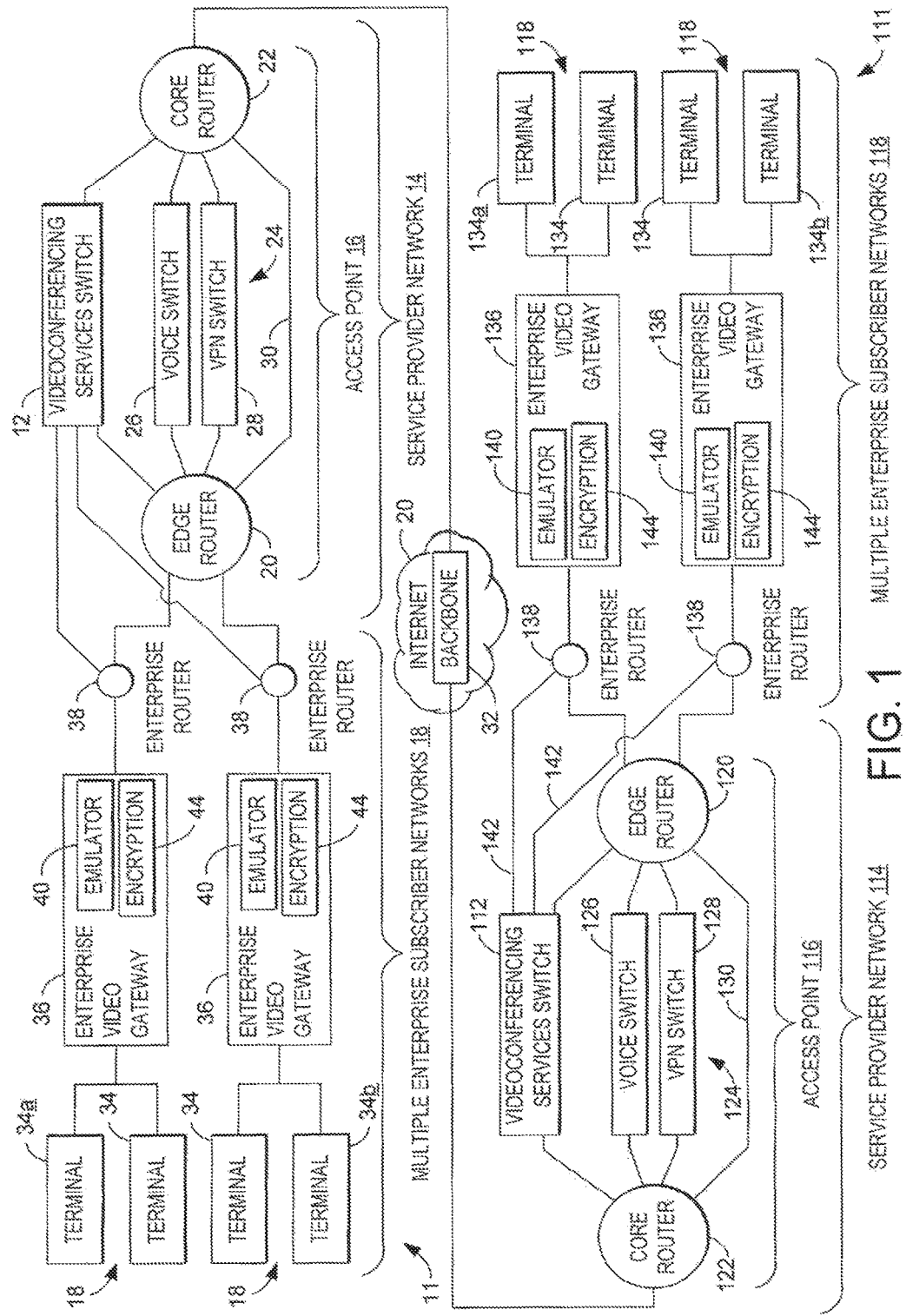
FIG. 1 is a schematic view of a videoconferencing system according to one embodiment of the present invention.

Referring initially to FIG. 1, a videoconferencing system according to one embodiment of the present invention is shown generally at 10. System 10 typically includes a videoconferencing services switch (VSS) 12 positioned on a service provider network 14 at an access point 16, typically a point of presence (POP). Switch 12 is configured to register multiple enterprise subscriber networks 18 for videoconferencing services, receive subscriber-specific settings for each subscriber 18 related to security and management of the videoconferencing calls from that subscriber, and process videoconferencing calls from each subscriber based on the associated subscriber-specific settings.

Service provider network 14 typically includes a packet-switched Internet Protocol (IP) network through which multiple enterprise subscriber networks 18 may access a global IP network 20, such as the Internet 20. Typically, the service provider network 14 includes an access point 16, such as a POP 16. The POP has a unique IP address and/or dial-up telephone number that a device on the enterprise subscriber network 18 may contact to access network 20.

POP 16 typically includes an edge router 20 and a core router 22 configured to route IP traffic into and out of POP 16. POP 16 also includes a plurality of services switches 24, including videoconferencing services switch 12, described above, Voice Over Internet Protocol (VOIP) services switch 26, and Virtual Private Network (VPN) services switch 28. Upon instruction, edge router 20 is configured to route traffic coming into POP 16 to an appropriate services switch for service-specific processing, or to core router 22 via direct link 30. Core router 22, in turn, is configured to route traffic from either of the services switches 24, or from direct link 30 out to the Internet 20. The traffic may be routed across a metropolitan area or long-haul backbone, which may be leased or owned by the service provider.

Traffic coming into the POP can be classified into videoconferencing data and non-videoconferencing data. Videoconferencing data typically includes control data and streaming voice and audio data according to the H.323 or SIP standards. H.323 refers to International Telecommunications Union, Telecommunications Sector, Recommendation H.323 (version 1, published November 1996; version 2, published 1998, entitled, "Visual Telephone Systems and Equipment for Local Area Networks Which Provide a Nonguaranteed Quality of Service," the disclosures of which are herein incorporated herein by reference. SIP refers to Session Initiation Protocol Proposed Standard (RFC 2543), Internet Engineering Task Force (IETF) (published March 1999), the disclosure of which is incorporated herein by reference. Non-videoconferencing data includes, for example, email, web pages, VOIP traffic, VPN traffic, etc. Videoconferencing data is typically routed through POP 16 via videoconferencing services switch 12, while non-videoconferencing data is routed around the switch.

Each of enterprise subscriber networks 18 typically includes a plurality of terminals 34. Terminals 34, along with video conferencing service switch 12 and the various other components of system 10, are typically H.323 or SIP compliant. Terminals 34 are typically videoconferencing devices configured to display and record both video and audio. Terminals 34 may be desktop computers, laptop computers, mainframes and/or workstation computers, or other videoconferencing devices. Terminals 34 may also be described as "endpoints" in a videoconferencing call. The terminal 34*a* originating the videoconferencing call is referred to as an origination endpoint 34*a*, and the other terminals requested to join in the call are referred to as destination terminals, shown at 34*b*, 134*a*, 134*b*. Terminal 34*b* is a local zone destination terminal, while terminals 134*a*, 134*b* are remote zone destination terminals. Local and remote zones are defined below.

Each enterprise subscriber network 18 also typically includes an enterprise video gateway 36 and enterprise edge router 38. Enterprise edge router 38 is configured to route data traffic between terminals 34 and service provider network 14, based on source and destination IP addresses.

Enterprise video gateway 36 typically includes an emulation module 40 which emulates H.323/SIP call control and firewall functionality and an encryption module 44. The gateway also typically has a globally routable IP address and is configured to manage secure communication between terminals 34 and the videoconferencing services switch 12. Typically, emulation module 40 appears to terminals 34 as H.323 gatekeeper/SIP proxy and H.323/SIP application proxy firewall which includes network address translation (NAT) capability, which hides internal addresses from outside devices.

Figure 10:
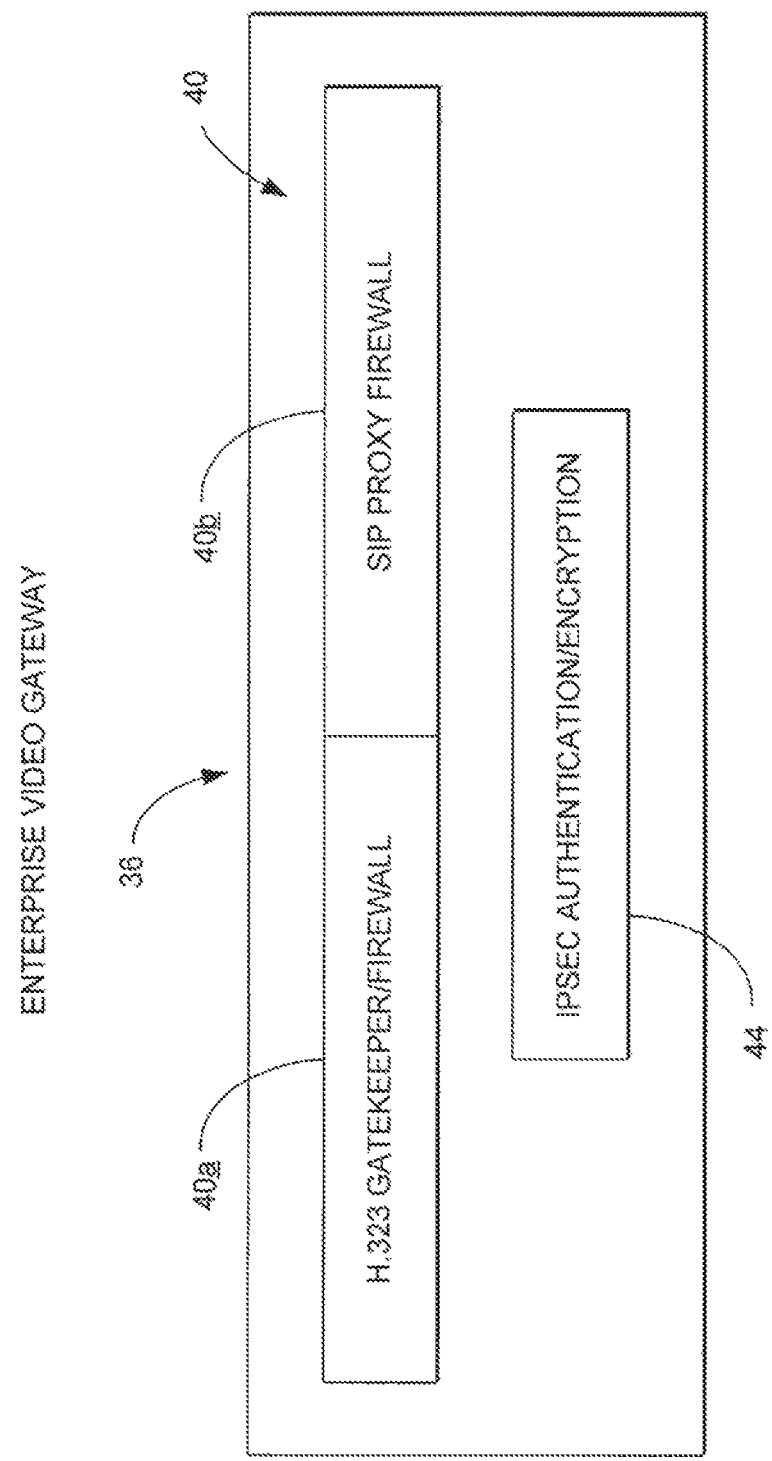
FIG. 10 is a schematic view of an enterprise video gateway of FIG. 1.

As shown in FIG. 10, enterprise video gateway 36 includes an encryption module 44. Encryption module 44 is typically an IP Security (IPSec) authentication and encryption module 44 configured to encrypt videoconferencing data coming from terminals 34 and send the encrypted data to videoconferencing switch 12. The IPSec protocols have been adopted by the Internet Engineering Task Force, and are described in the RFC 2411 entitled "IP Security Document Roadmap" (published November 1998), the disclosure of which is herein incorporated by reference. By using IPSec, a Virtual Private Network (VPN) may be created between the gateway 36 and the switch 12. VPN refers to a network that is carried over public networks, but which is encrypted to make it secure from outside access and interference.

Videoconferencing data may be carried from terminal 34 to service provider network 14 via one of two routes. First, the videoconferencing data may be routed by edge router 38 via a direct network connection 42, such as a TI connection, to the videoconferencing services switch 12 of the service provider network 14. In this case, the direct network connection is dedicated to video traffic. Second, firewall 40 may be configured to pass encrypted videoconferencing data through the firewall unexamined. Typically, the encrypted videoconferencing data is encrypted by the encryption module 44 of the enterprise video gateway 36 using the IPSec protocols, discussed above.

System 10 is divided into local metropolitan zone 11 and remote metropolitan zone 111 separated by backbone 32. Local metropolitan zone 11 includes all devices that connect to POP 16, and remote metropolitan zone 111 includes all devices that connect to POP 116. Components within remote metropolitan zone 111 are similar to those in local metropolitan zone 11 and are numbered correspondingly, and therefore will not be redescribed in detail.

System 10 may be configured to connect a two-party or multiparty videoconference call from an origination terminal 34*a* to a destination terminal 34*b* on local zone 11, and/or one or more destination terminals 134*a* and 134*b* on remote zone 111. A destination terminal on local zone 11 may be referred to as a local destination terminal, and a destination terminal on remote zone 111 may be referred to as a remote destination terminal.

Figure 2:
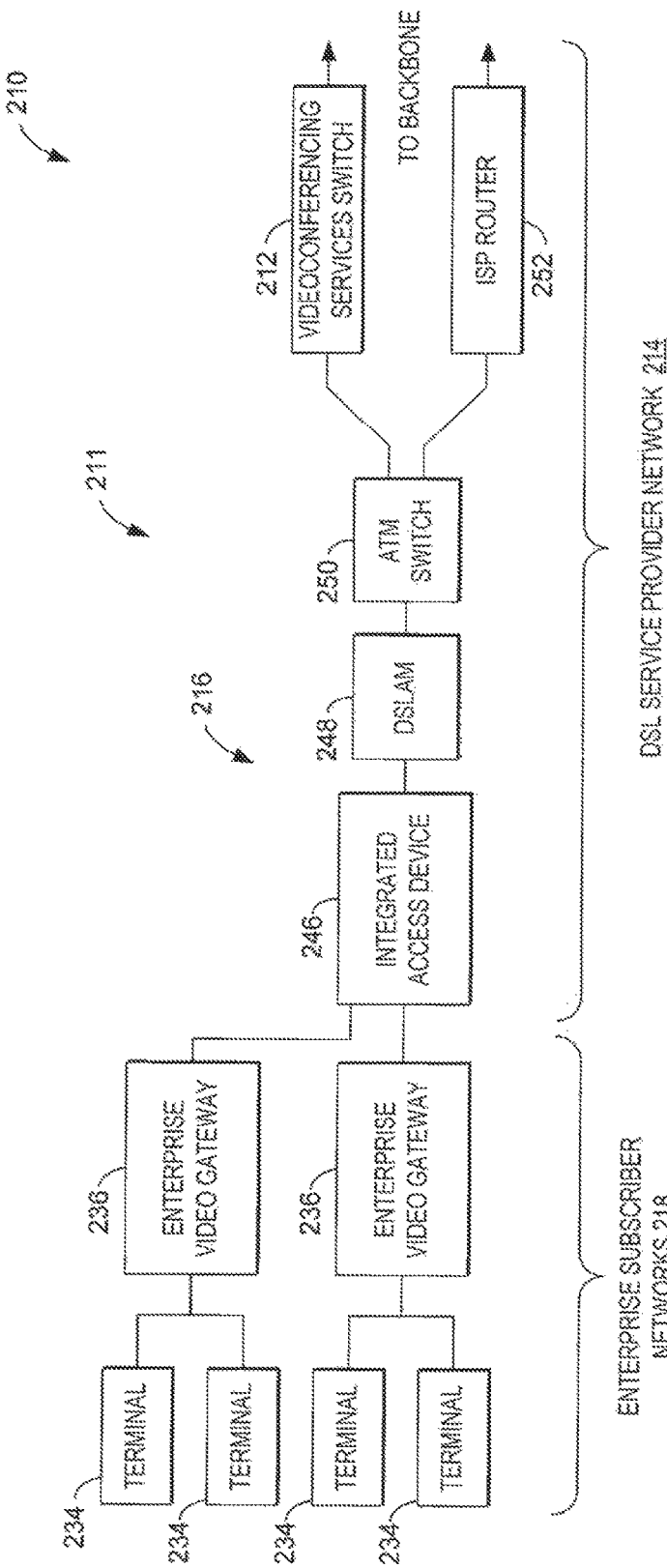
FIG. 2 is a schematic view of a videoconferencing system according to another embodiment of the present invention.

FIG. 2 shows another embodiment of a videoconferencing system 210 having a local zone 211. It will be appreciated that a remote zone of system 210 is a mirror image of zone 211, similar to that described above for system 10. Local zone 211 includes multiple enterprise subscriber networks 218 linked to a Digital Subscriber Line (DSL) service provider network 214 via an access point 216, typically called a central office.

Each enterprise subscriber network 218 includes a plurality of terminals 234 which are similar to terminals 34 described above. Integrated Access Device (IAD) 246 is configured to receive traffic from enterprise subscriber networks 218 and forward the traffic to the Digital Subscriber Line Access Multiplexor (DSLAM) 248. The DSLAM is configured to multiplex the traffic from the IADs and forward it to Asynchronous Transmission Mode (ATM) switch 250, where the signals are demultiplexed for transmission over a long-haul backbone. ATM switch 250 is configured to route videoconferencing data to and from terminals 234 and the backbone via videoconferencing services switch 212, and non-videoconferencing data via ISP router 252, or another services switch.

Figure 3:
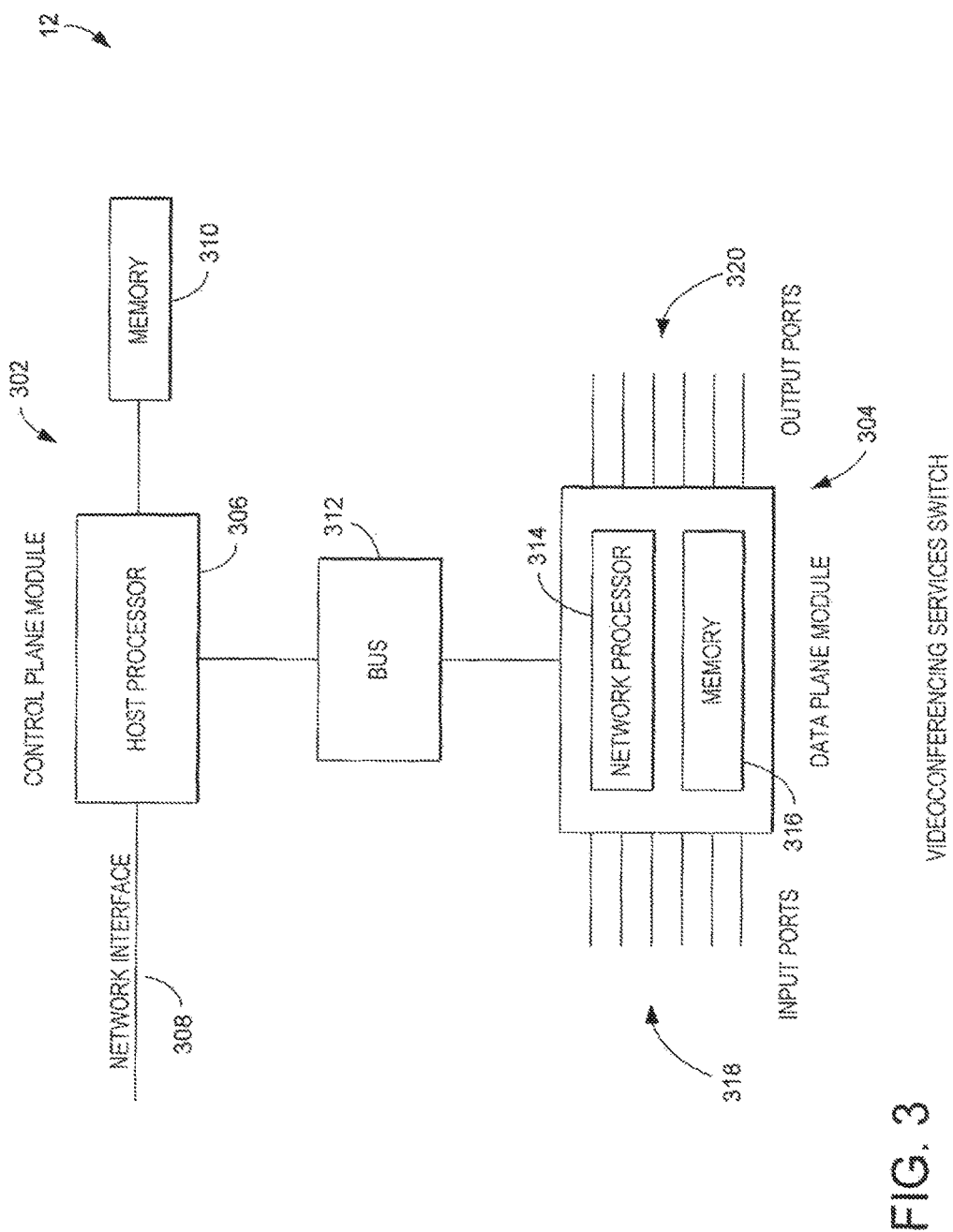
FIG. 3 is a schematic representation of a hardware configuration of a videoconferencing switch of FIG. 1.

FIG. 3 shows an exemplary hardware configuration for videoconferencing services switch 12. One switch that may be purchased and programmed to implement the present invention is the Intel Exchange Architecture (IXA) WAN/Access switch, commercially available from Intel Corporation, of Santa Clara, Calif. and Radisys Corporation of Hillsboro, Oreg.

Switch 12 typically includes a control plane module 302 and a data plane module 304. Control plane module 302 includes a host processor, linked to an input/output network interface 308 and a memory 310. Typically, memory 310 includes RAM and ROM, although another form of memory may also be used, such as flash memory. Alternatively, a storage device such as a hard drive may also be attached to host processor 306. Control plane module 302 is configured to receive control data such as call set-up information through network interface 308, data plane ingress port 318, or data plane egress port 320. The call set-up information is processed according to H.323 or SIP specifications by host processor 306. Typically, the programs and data necessary for processing the call are stored in memory 310 and implemented by host processor 306. For example, the virtual router, call control module, quality of service module, policy engine, and security module are typically stored in memory 310.

Control plane module 302 is linked to data plane module 304 via a bus 312. Data plane module 304 includes a network processor 314 and memory configured to receive and manage transfer of real-time audio and video data streams from ingress ports 318 to egress ports 320. Data plane module 304 typically includes a wire-speed switching fabric, capable of processing real-time data streams with virtually no appreciable latency.

The wire-speed switching fabric is configured to enable transport of streaming data traffic across system with virtually no appreciable latency, even as the streaming data traffic is processed and analyzed by system 10 to impose H.323/NAT-specific firewall and NAT capabilities, policies from policy engine 418, monitor quality of service, and provide optional encryption and other security measures. One implementation of system 10 is configured to provide aggregate streaming data throughput of up to 1.048 Gbps with full security and policy management, quality of service management, and encryption. The wire-speed switching fabric includes full support for IETF standard IP routing protocols such as Open Shortest Path First (OSPF), Border Gateway Protocol (BGP), and Routing Information Protocol (RIP), which are well known in the networking arts. Support of these routing protocols will allow system 10 to forward video traffic appropriately to edge router 20 and core router 22 in the service provider access point 116.

Figure 4A:
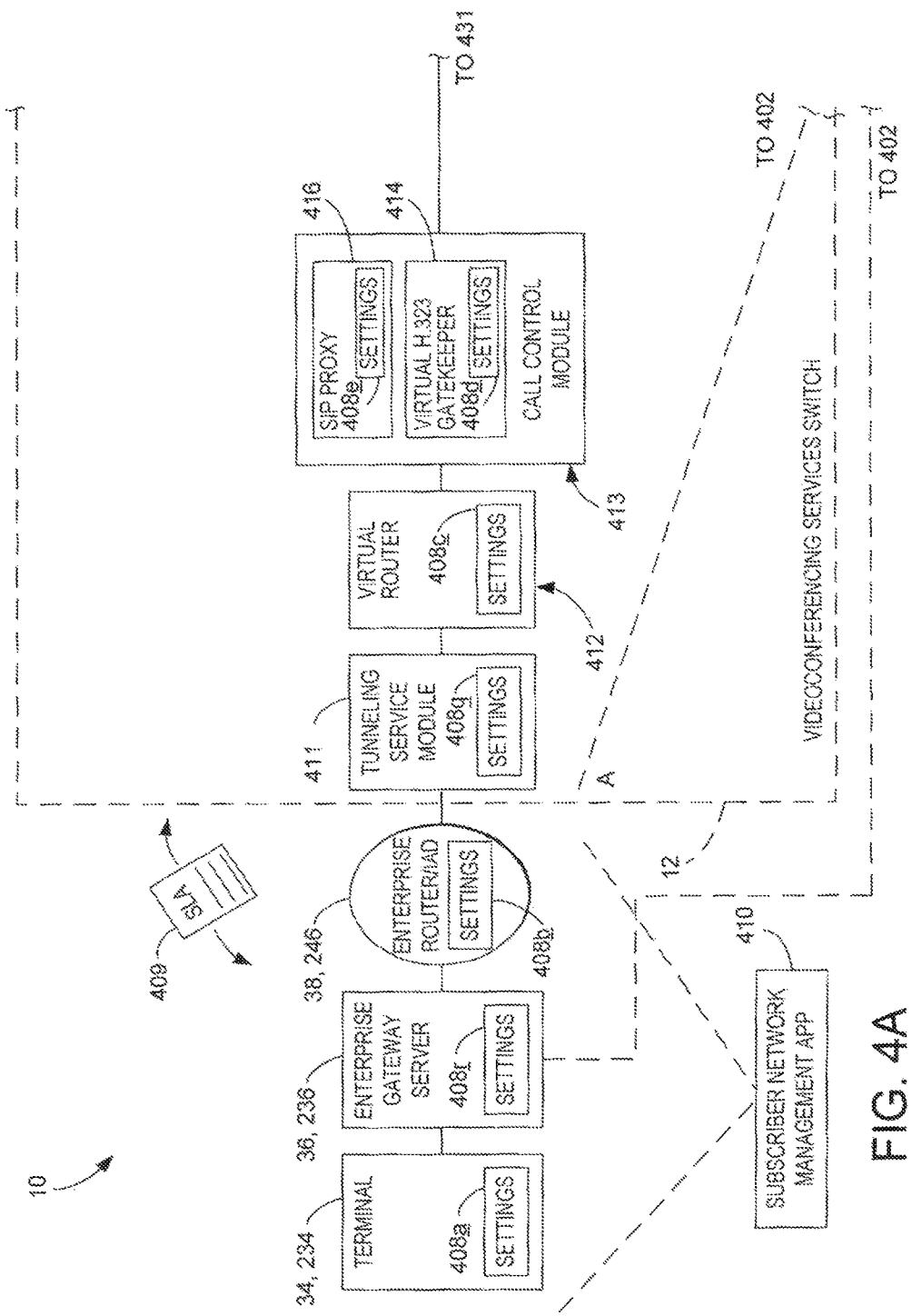
FIG. 4A is a software architecture of the videoconferencing system of FIG. 1.
Figure 4B:
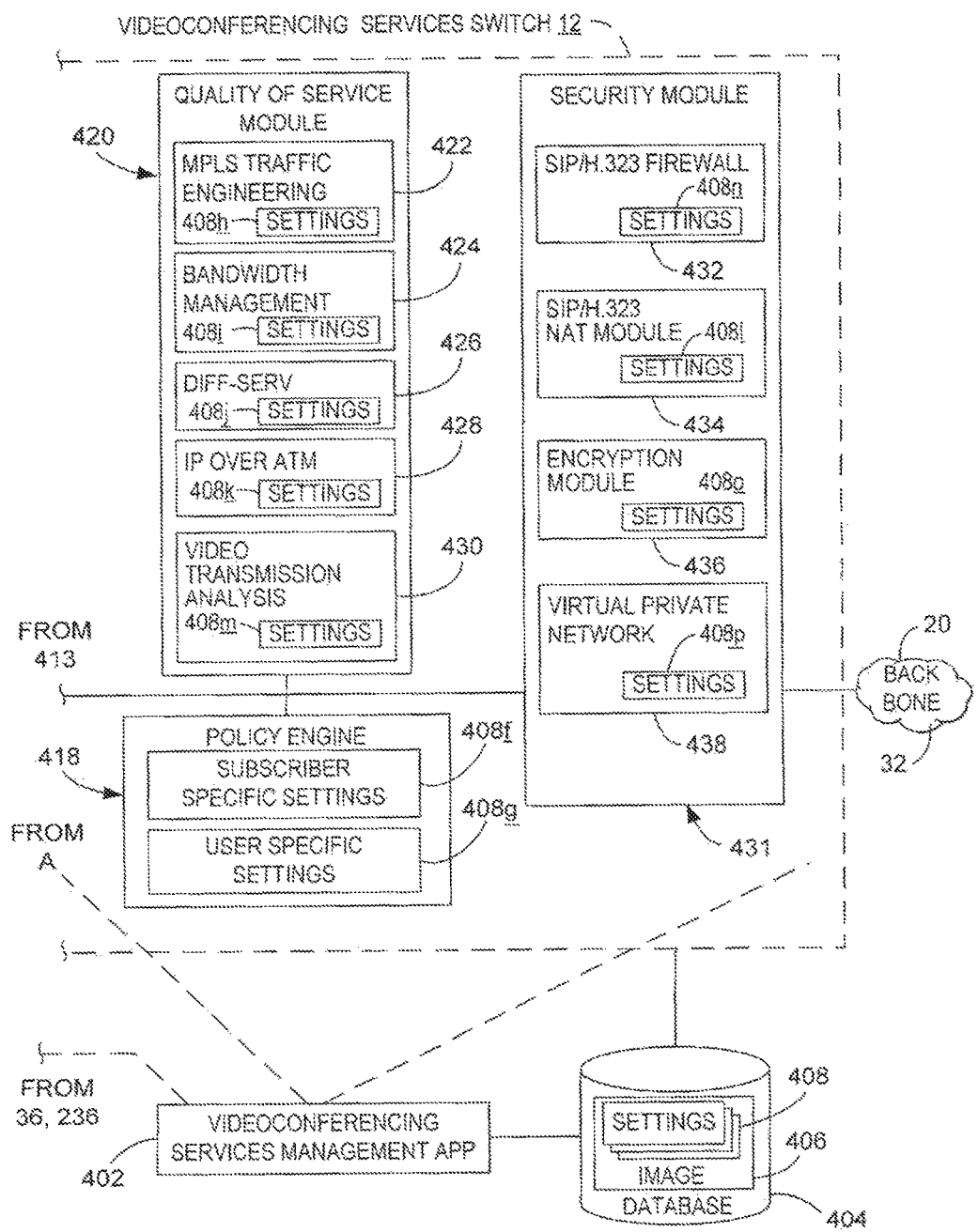
FIG. 4B is a continuation of the software architecture of FIG. 4A.

FIG. 4 shows a schematic view of the software components of videoconferencing system 10. Enterprise network 18 typically includes terminal 34 having terminal settings 408a, enterprise video gateway 36 having gateway settings 408o, and an enterprise edge router/IAD 38, 248 having enterprise router settings 408b. Settings 408a, 408o, and 408b are referred to as enterprise network resident settings, while the remaining settings 408c-408n, 408p are referred to as switch resident settings.

Terminal settings 408a typically include the IP address of the enterprise gateway, which acts as a proxy to the call control module 413 in videoconferencing switch 12. For calls placed with the H.323 protocol, the IP address of the enterprise gateway 36 (which also acts as a proxy to the videoconferencing services switch H.323 gatekeeper 414) is provided. For calls placed with the SIP protocol, the IP address of the enterprise gateway 36 (which also acts as a proxy to the videoconferencing services switch SIP proxy 416) is provided. Terminals use the IP address of the enterprise gateway for registration (using e.g. H.323 RAS signaling), call initiation (using e.g. H.323 ARQ signaling), and audio/video data exchange (using e.g. RTP/RTCP protocols). Users may optionally authenticate themselves with H.323 gatekeeper/SIP proxy. The enterprise gateway 36 encapsulates these messages in packets having the enterprise video gateway's globally routable IP address as the source address and forwards these messages to the call control module 413 in videoconferencing services switch 12. Typically, these packets are sent in an encrypted form using IPSec.

Enterprise video gateway settings 408o include secure communication channel settings. Typically, this includes instructions on how to create a secure communication channel between the enterprise gateway and the videoconferencing switch 12 according to the IPSec protocol, discussed above. Traffic sent using the IPSec protocol typically passes through firewall 40 unexamined. Adjusting settings 408o of the enterprise video gateway to enable IPSec authentication and encrypted data exchange with the video services switch may either be accomplished locally by the enterprise administrator or service provider personnel via subscriber network management application 410, or remotely via the video conferencing services management application 402.

Enterprise edge router settings 408b typically include the globally routable IP address of the enterprise gateway 36, and the address of an H.323 gatekeeper 414 and/or SIP proxy 416 within the videoconferencing services switch 12. The enterprise edge router may also be configured to direct traffic from a terminal to the gatekeeper 414 or proxy 416 along direct connection 42. Enterprise edge router settings 408b may also include prioritization information for traffic passing though the edge router, such that the router may tag packets passing through with Diff-Serv labels or process packets based on Diff-Serv labels.

For DSL service provider network 112, shown in FIG. 2, terminal settings 408a are configured with the IP address of the call control module 413, as discussed above. IAD settings 408b are set to create a separate ATM permanent virtual circuit (PVC) or Frame Relay (FR) Data Link Communication Identifier (DLCI) for video traffic destined for the videoconferencing services switch. Optionally, the settings 408b may include priority settings for processing and delivery of video PVC/DLCI traffic.

Switch 12 typically includes a tunneling service module 411 having subscriber-specific settings 408q. The tunneling service module is configured to support secure communication channels from a multiple enterprise video gateways 36, using the IPSec protocol described above. The tunneling service module unencapsulates traffic from enterprise video gateways 36. It also maintains a dynamic mapping of IP address of each enterprise video gateway and port numbers so that the enterprise video gateway can correctly route call setup and video traffic back through to the appropriate enterprise video gateway.

Switch 12 typically includes a virtual router 412 configured to route requests from terminal 12 to call control module 413. Typically, at least one virtual router having a unique IP address is provided for each subscriber network 18. Traffic is routed between call control module 413 and enterprise video gateway/IAD 36, 246 based on settings 408c. The virtual router settings 408c typically include the address of enterprise edge router 38 or IAD 246, information about the dedicated physical connection 42, and or the POP edge router 20. Typically, a separate virtual router is provided for each enterprise subscriber. To configure the routing services, the switch provides BGP and OSPF routing on a per-virtual router basis. Thus, separate routing tables are maintained for each subscriber to segment its traffic.

Calls in the H.323 protocol are routed to virtual H.323 gatekeeper 414, while calls in the SIP protocol are routed to SIP Proxy 416. Call control module 413 is configured to perform call set-up operations, manage call data streams, and perform call tear-down operations.

Switch 12 also includes a policy engine 418 configured to enforce policies based on subscriber-specific settings on the videoconferencing calls. The policies may be based on subscriber-wide settings 408*f* that apply to all calls from a given subscriber, and user-specific settings that apply to only a single user or terminal of a given subscriber. Exemplary policies include outbound/inbound calling privileges, encryption policies, bandwidth policies, priority among users policies, participation privileges, inbound/outbound calling restrictions, time-of-day restrictions, audio or video restrictions. Each of these exemplary policies may be implemented on a per-user or per-subscriber basis. For example, a particular user may be able to use unlimited bandwidth, have a top priority among users, be allowed to both view and participate in calls, be able to both initiate outbound and receive inbound calls, from 8 am-6 pm Mon-Fri, and not be restricted to only audio or only video calling.

Switch 12 also includes a quality of service module 420 having a Multi Protocol Label Switching (MPLS) traffic engineering module 422 configured to create a network path engineered according to the MPLS standard. The MPLS architecture is described in the January 2001 Request For Comments entitled "Multiprotocol Label Switching Architecture," published by the Internet Engineering Task Force, the disclosure of which is herein incorporated by reference. Module 422 is configured to create secure MPLS tunnels that offer a guaranteed bandwidth for video traffic, based on subscriber-specific settings 408*h*. Settings 408*h* may include the desired bandwidth a subscriber has purchased, or the type of security to be applied to the MPLS traffic, etc.

Quality of service module 420 also includes a bandwidth management module 424 configured to manage the bandwidth allocated to each videoconferencing call and/or call participant. By managing the bandwidth based on subscriber-specific bandwidth settings 408*i*, network congestion can be avoided.

Quality of service module 420 also includes a differentiated services module 426 configured to implement differentiated services policy management according to the Differentiated Services standard described in the Definition of Differentiated Services Per Domain Behavior and Rules for their Specification, published by the Internet Engineering Task Force (January 2001), the disclosure of which is herein incorporated by reference. This typically includes labeling a precedence parameter for video traffic, i.e. RTP streams, stored in settings 408*j*.

Quality of service module 420 also includes an IP-over-ATM module 428 configured to send IP traffic over ATM switches, and settings 408*k* therefor. IP-over-ATM module 428 is compliant with the standards described in Internet Engineering Task Force Request for Comments (RFC) 2684. Typically, settings 408*k* for IP-over-ATM module 428 are configured on a per-virtual router and per-physical interface basis.

Quality of service module 420 also includes a video transmission analysis engine 430 configured to analyze videoconferencing data carried by the switch for quality parameters specified in transmission analysis settings 408*m*. Exemplary quality parameters include packet loss, jitter, and latency.

Videoconferencing services switch 12 also typically includes a security module 431. Security module 431 typically includes a SIP/H.323 firewall 432, SIP/H.323 NAT module 434, encryption module 436, and Virtual Private Network (VPN) module 438. SIP/H.323 firewall 432 is configured to prevent unauthorized access to video services switch 402, and through it to subscriber networks. The firewall settings 408*n* of firewall 432 are configured on a per-subscriber basis, such that a subscriber-specific firewall may be custom-implemented for traffic from each subscriber. SIP/H.323 NAT module 434 is configured to provide network address translation services for traffic flowing through switch 12. NAT settings 408*l* are also subscriber-specific. VPN module 438 is configured to create a virtual private network for data flowing from switch 12 over network 20.

System 10 typically includes a videoconferencing services management application 402 configured to enable the service provider to adjust the switch-resident settings of videoconferencing services switch 12 and settings 408*o* of enterprise video gateway 36, 236. System 10 also includes a subscriber network management application 410, by which an administrator may adjust settings of devices on subscriber network 18, such as settings 408*a* on terminal 34, 134, 408*b* on enterprise router/IAD 38, 246. Typically, subscriber network administrator uses subscriber network management application 410 to adjust the settings of each terminal when the terminal is installed or reconfigured. Alternatively, terminal settings 410*a* may be set remotely by the service provider via videoconferencing services management application 402.

Videoconferencing services management application 402 is configured to interface with a database 404, which contains a database image 406 of records for subscriber-specific settings 408 for each of the multiple enterprise subscriber networks 18. Many of the subscriber-specific settings 408 are governed by a Service Level Agreement (SLA) 409. The SLA is an agreement executed between each enterprise subscriber and the service provider. The SLA contains terms for the level of videoconferencing service to be provided to a particular enterprise subscriber network. One exemplary term contained in the SLA is a video quality term, which indicates the maximum and/or minimum video quality the subscriber is to receive, either on a per-subscriber, per-user, or per-terminal basis. Often, video quality is defined as packet loss, jitter, and latency being within an acceptable predetermined range. While, typically, terminal settings 408*a* and enterprise router settings 408*b* are stored locally on enterprise subscriber network 18, it will also be appreciated that they may be stored on database 404. The switch resident settings are typically loaded into video services switch 12 periodically, such as once per day, by downloading database image 404 into memory of switch 12. The enterprise video gateway server settings 408*r* may be downloaded in a similar manner from database 404 via videoconferencing services management application 402.

Figure 5:
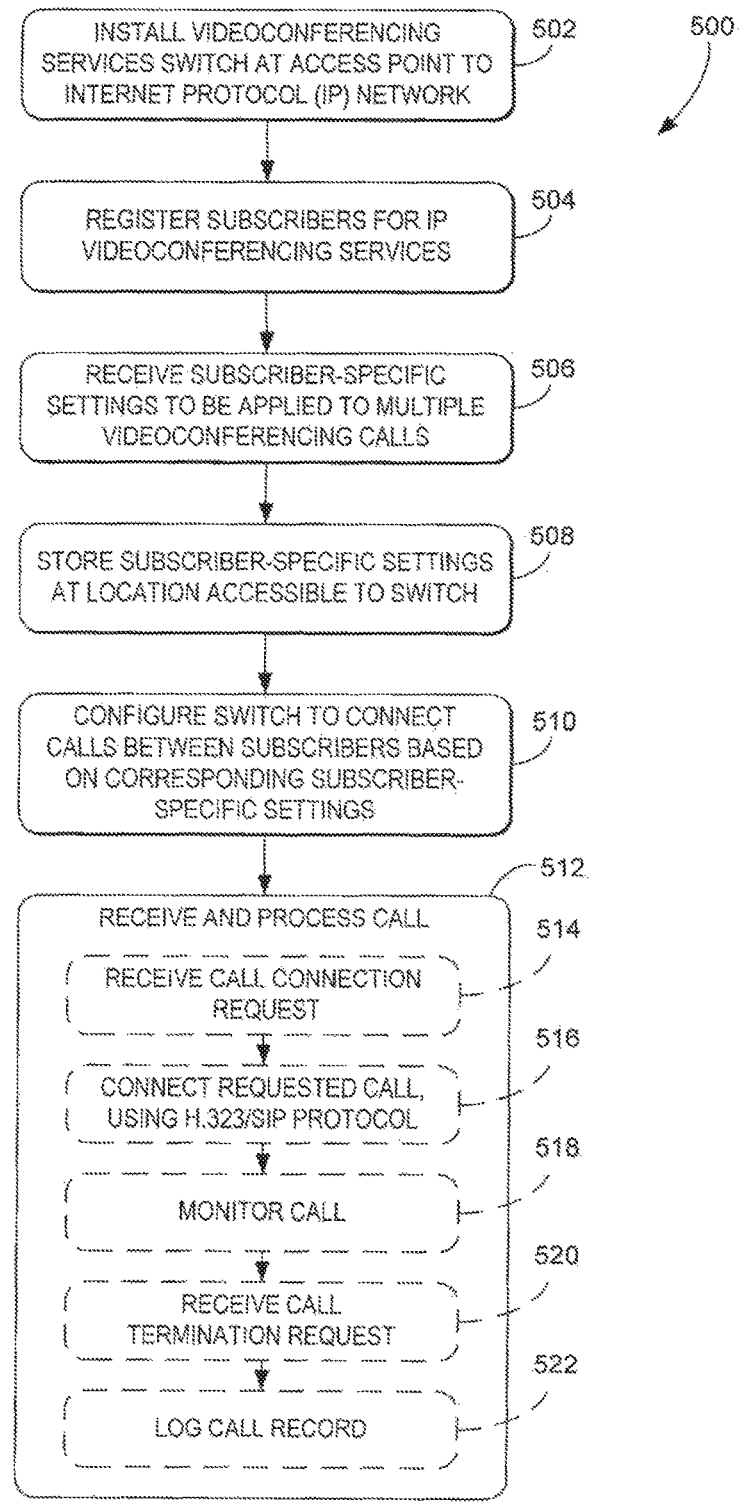
FIG. 5 is a flowchart of a videoconferencing method according to one embodiment of the present invention.

In FIG. 5, a method according to one embodiment of the invention is shown generally at 500. Method 500 typically includes, at 502, installing a videoconferencing services switch (VSS) 12 at an access point 16 to an Internet Protocol (IP) network 20. At 504, the method typically includes switch 12 registering multiple enterprise subscriber networks 18 for IP videoconferencing services.

At 506, the method includes receiving subscriber-specific settings 408 to be applied to multiple videoconferencing calls originating from the subscriber. The subscriber-specific settings may be set and accessed by an administrator at an enterprise network and/or an administrator at service provider (SP) network 14 via management applications 402, 410, described above. At 508, the method further includes storing subscriber-specific settings at a location accessible to switch 12. Typically, the subscriber-specific settings are stored on switch 12 and enterprise video gateway 36, and in database 404. Certain subscriber-specific settings 408 may also be stored on terminal 34 and enterprise router 38, as described above.

At 510, method 500 includes configuring switch 12 to connect videoconferencing calls between subscribers based on corresponding subscriber-specific settings. Step 510 is typically accomplished via steps 602-620, described below.

At 512, the method further includes receiving and processing a videoconferencing call at switch 12. Typically, a user at a terminal 34 at enterprise subscriber network 18 initiates a call connection request for a videoconferencing call with a user at a destination terminal, such as remote destination terminals 134a, 134b or local destination terminal 34b. The call connection request typically includes pertinent information such as the origination and destination party address.

Step 512 is typically accomplished by, at 514, receiving the call connection request at switch 12 and proceeding to connect the requested call by using the H.323 or the Session Initiation Protocol (SIP) protocol at 516. The protocol used is determined by the subscriber-specific settings, or by the call request itself.

Once the call connection request is processed and videoconferencing is occurring, at 518, the method includes monitoring the established videoconferencing call. Switch 12 may monitor or record call information related to videoconferencing such as quality, duration of call, etc.

Typically, when the user wishes to end the videoconferencing call, the user will send a call termination request. The method includes receiving the call termination request at 520. The method further includes logging the videoconferencing call information in a call record at 522. The call record may serve to provide billing information to SP 14 and to obtain data for quality assurance purposes. The call record may include length of call, parties on the call, bandwidth used by the call, measured quality of the call (as determined for example by jitter, latency, and packet loss), among other parameters.

Figure 6:
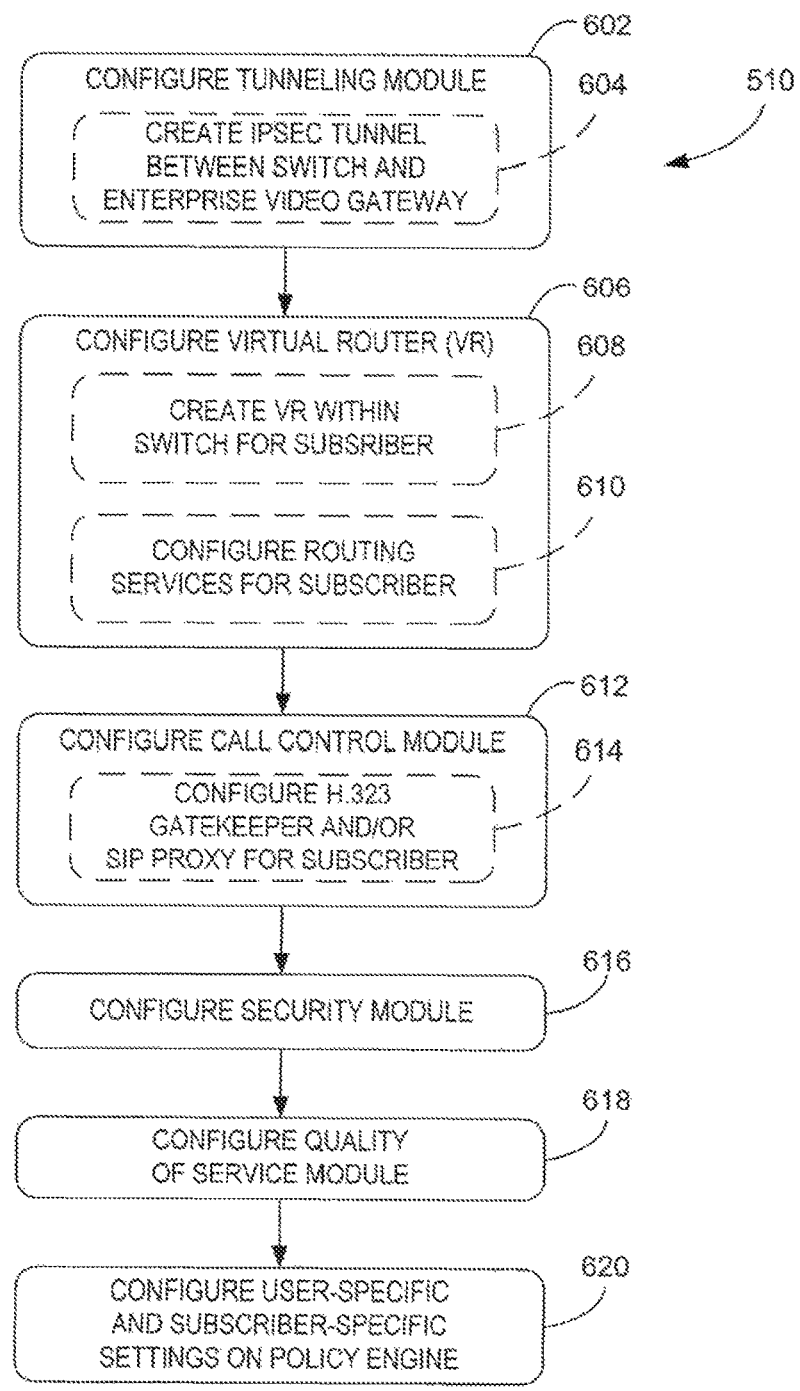
FIG. 6 is a flowchart of one exemplary method for accomplishing the step of configuring the switch of the method of FIG. 5.

Referring to FIG. 6, configuring switch 12, at 510, to connect videoconferencing calls includes configuring various components and modules as shown. At 602, step 510 includes configuring a tunneling module, which includes at 604, creating an IPSec tunnel between switch 12 and gateway 36. This step requires setting up IPSec authentication and encryption parameters on switch 12, as described. The tunneling module unencapsulates traffic from gateway 36 and maintains a dynamic mapping of IP address of servers 36 and port numbers, thus allowing gateway 36 to route call set-up correctly and video traffic back through the appropriate gateway 36.

Step 510 includes, at 606, configuring a virtual router (VR) 412, which includes, at 608, creating VR 412 within switch 12 for subscriber 18. Typically a subscriber edge router 20 is mapped onto switch 12. VR 412 is integral to module segmentation and layering architecture of switch 12.

Step 606 further includes, at 610, configuring routing services for subscriber 18, which includes the support of BGP and OSPF routing using VR 412. Typically routing tables are maintained for subscriber 18 to segment traffic.

Step 510 includes, at 612, configuring a call-control module. At 614, step 612 includes configuring H.323 gatekeeper 414 and/or SIP proxy 416 for subscriber 18. For H.323 gatekeeper 414, configuring gatekeeper 414 includes configuring a subscriber zone in gatekeeper 414, discovery and registration of endpoints, security, inter-gatekeeper communication, creation of records for billing and administrative purposes, etc. For SIP proxy 416, configuring proxy 416 includes discovery and registration of endpoints, information from Domain Name Service (DNS) server, creation of records, etc.

Step 510 further includes configuring security module at 616, configuring quality of service module at 618, and configuring user-specific and subscriber-specific settings on a policy engine 418 at 620.

Figure 7:
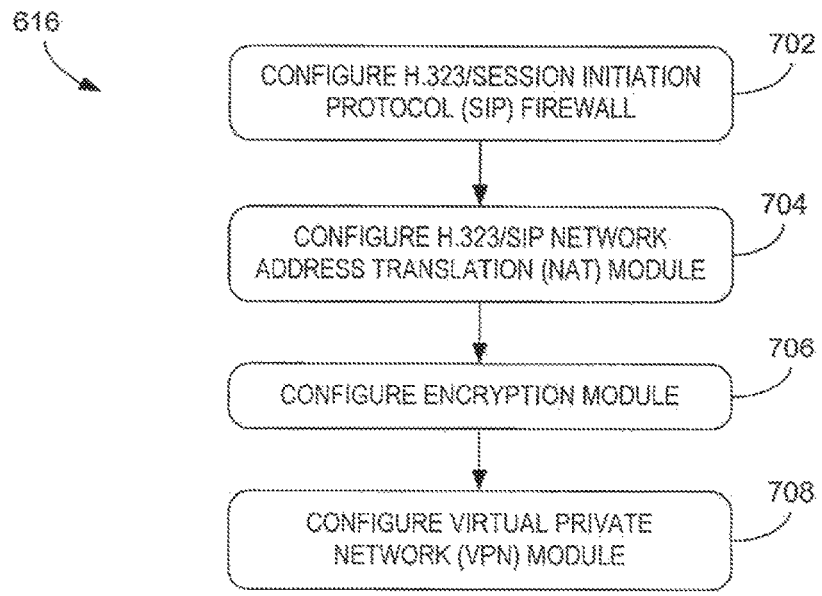
FIG. 7 is a flowchart of one exemplary method for accomplishing the step of configuring the security module of the method of FIG. 6.

Referring to FIG. 7, step 616 includes configuring H.323/SIP firewall 432 at 702. H.323/SIP applications parse control data to dynamically open and close ports for control traffic. Information obtained from parsing is sent to network data plane hardware 304. Configuring firewall 432 includes adding firewall address information into gatekeeper 414 for the zone, setting ports or channels that are statically open, and setting security logging.

Step 616 further includes configuring H.323/SIP network address translation (NAT) module at 704. For H.323 NAT module, the NAT module is configured to parse packet headers and payload of Q.931/H.245 control data streams during call set-up. For outgoing data, the NAT module is further configured to substitute non-routable endpoint source IP addresses and port numbers with its own globally unique H.323 proxy IP address and port numbers. For incoming data, the NAT substitutes non-routable, or internal endpoint destination IP addresses and port numbers by using stored IP address/port number mapping information.

Step 616 further includes configuring the encryption module at 706. Encryption is used only at certain enterprise subscribers 18 and destination IP addresses. For example, enterprises 18 may want encrypted communication with selected destination parties.

Lastly, step 616 includes configuring virtual private network (VPN) module at 708. Configuring VPN module includes configuring a subscriber VR with MPLS VPN capability including creation of VPN routing/forwarding tables. Step 708 further includes configuring BGP routing sessions, VR to SP edge-routing sessions, RIP/BGP/static route to subscriber edge-routing sessions, etc. By configuring switch 12 to support an MPLS VPN module, video-specific VPNs can exist across ATM, IP and L2-type backbone networks. In addition, subscribers to MPLS VPNs may be dynamically updated to enable simplified creation of extranet and intranet VPNs and site-to-site video traffic delivery.

Figure 8:
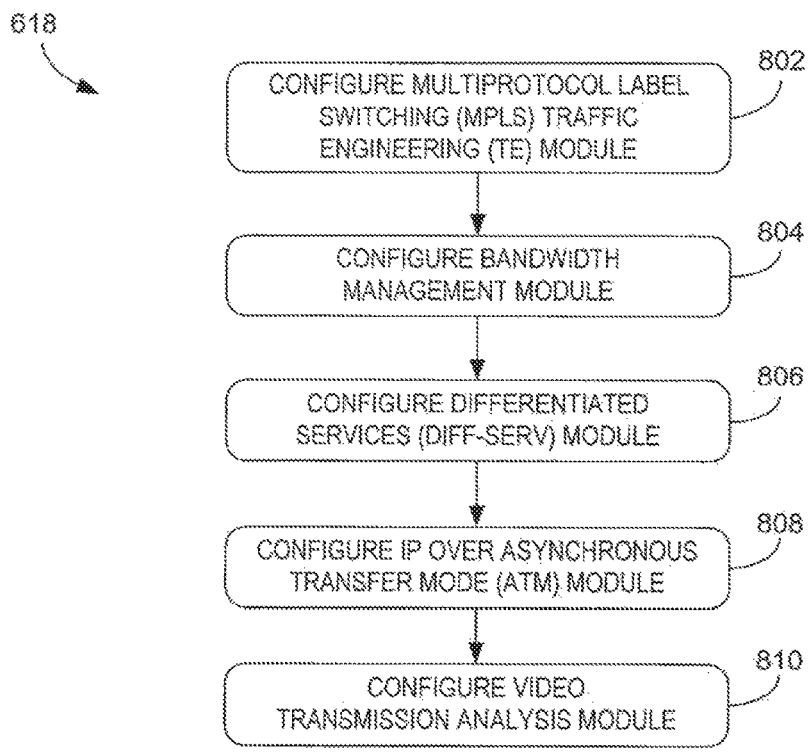
FIG. 8 is a flowchart of one exemplary method for accomplishing the step of configuring the quality of service module of the method of FIG. 6.

Referring to FIG. 8, step 618 of configuring quality of service module includes configuring an MPLS traffic engineering (TE) module at 802. Configuring switch 12 to support MPLS TE enables creation of premium-priced guaranteed bandwidth videoconferencing data paths across an SP MPLS backbone. Step 802 further includes configuring of MPLS tunnels, enabling of express forwarding of data, and enabling Intermediate System-Intermediate System (IS-IS) routing, as is commercially implemented in the products of Cisco Systems of San Jose, Calif. This is typically accomplished by adjusting settings 408h.

At 804, the method further includes configuring bandwidth management module 422, typically by adjusting settings 408i. This enables setting of maximum video bandwidth allowed into or from an enterprise subscriber by time of day.

At 806, the method further includes configuring differentiated services (Diff-Serv) module 426 at 806, typically by adjusting Diff Serv settings 408j. These settings may be used to configure the TOS/IP precedence field for video traffic (i.e. RTP streams) to/from each enterprise. This enables core devices in an SP network to give prioritized treatment to video traffic.

At 808, the method further includes configuring IP over asynchronous transfer mode (ATM) module, typically by adjusting settings 408*k*. IP over ATM services are configured on a per-virtual router and per-physical interface basis.

At 810, the method further includes configuring video transmission analysis module, typically by adjusting settings 408*m*. Configuration of size of jitter buffer within the videoconferencing services switch is accomplished on a per-enterprise subscriber basis.

Figure 9:
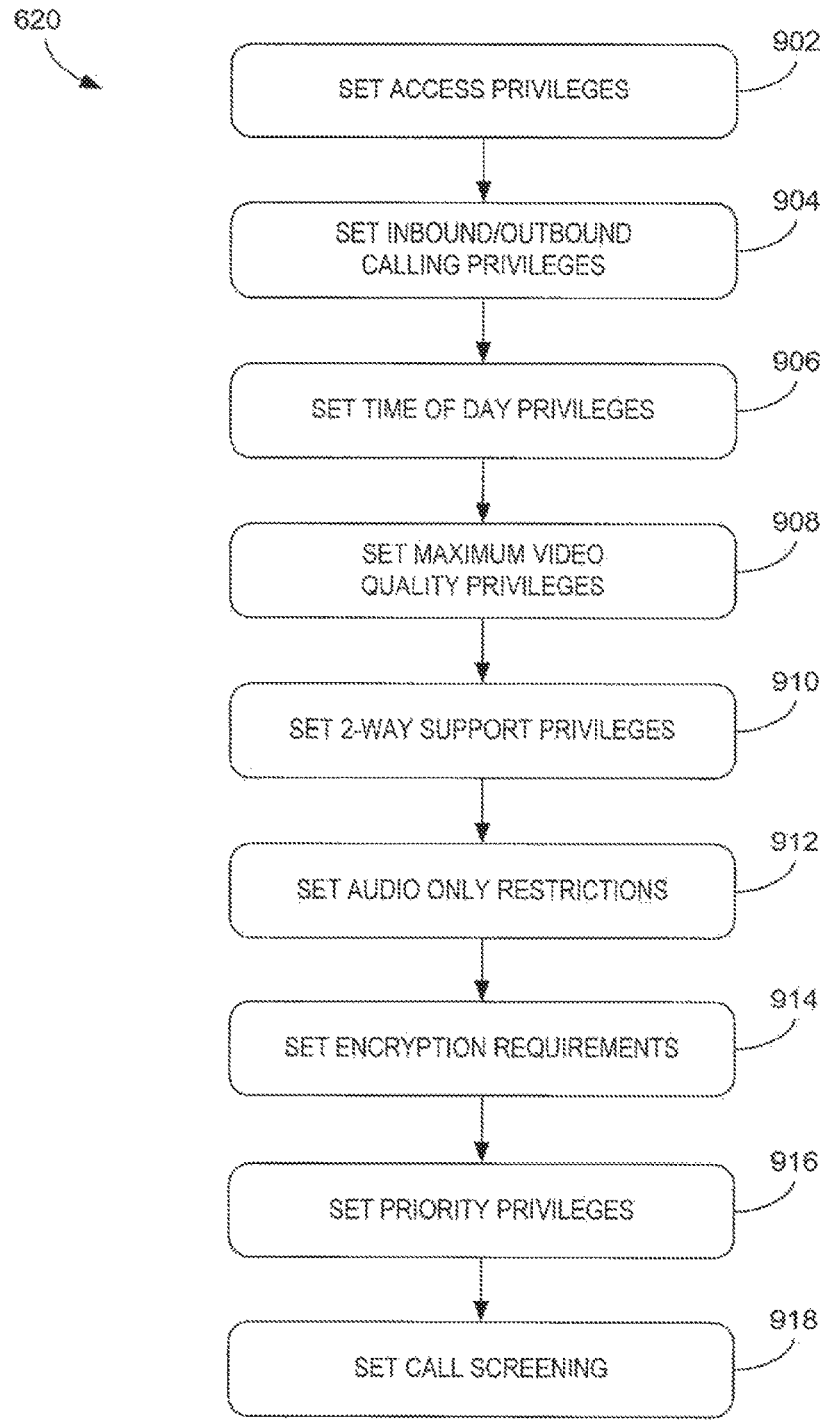
FIG. 9 is a flowchart of one exemplary method for accomplishing the step of configuring the user-specific and subscriber-specific settings of the method of FIG. 6.

FIG. 9 shows, in steps 902-918, one exemplary method of accomplishing step 620 of configuring user-specific and subscriber-specific policies on policy engine 418. The method typically includes, at 902, setting access privileges. Access privileges govern who can access the video system with user level and administrator level access privileges. At 904, the method includes setting inbound/outbound calling privileges on a per-user or per-subscriber basis. For example, every user in an enterprise may be prohibited from making outbound calls on company holidays, except upper management. At 906, the method typically includes setting time-of-day privileges per user or subscriber. For example, every user may be restricted from placing calls outside of regular business hours. At 908, the method typically includes setting maximum video quality privileges per user, or per subscriber.

At 910, the method typically includes setting 2-way support privileges. This allows a user to either send, receive, or both send and receive videoconferencing data pertaining to a call. At 912, the method includes setting audio-only restrictions on a per-user or per-subscriber basis. The method includes setting encryption requirements at 914. At 916, the method typically includes setting priority privileges on a per-user or per-subscriber basis. Videoconferencing data sent by a user with higher priority privilege will take precedence over other data sent by a user of lower priority, or over other lower priority data, such as email. At 918, the method typically includes setting videoconferencing call screening. This enables a user or subscriber to block incoming calls from a user-specified source. The policies set in step 620, and substeps 902-918 are typically saved as user-specific and subscriber-wide settings 408*f,* 408*g*.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

We claim:

1. A videoconferencing services switch adapted for deployment in a global Internet Protocol (IP) network and to communicate with at least one other videoconferencing services switch across the global IP network, the videoconferencing services switch comprising:
    a call control module capable of receiving call control data from call origination and destination IP videoconferencing endpoints in subscriber IP networks; and
    a tunneling services module configured to receive real-time audio and video data streams from the call origination and destination IP videoconferencing endpoints;
    wherein the videoconferencing services switch is configured to process videoconferencing calls based on subscriber-specific settings.

2. The videoconferencing services switch of claim 1, wherein the subscriber-specific settings comprise settings that apply to all calls.

3. The videoconferencing services switch of claim 1, wherein the tunneling services module is configured to receive encrypted real-time audio and video data streams from the call origination and destination IP videoconferencing endpoints.

4. The videoconferencing services switch of claim 1, wherein at least one of the subscriber IP networks is connected to the global IP network through a network address translation (NAT) device located in the subscriber IP network.

5. The videoconferencing services switch of claim 1, wherein the subscriber-specific settings include network address translation (NAT) settings.

6. The videoconferencing services switch of claim 1, wherein the subscriber-specific settings are stored at a location accessible to the videoconferencing services switch.

7. The videoconferencing services switch of claim 1, further comprising: a repository configured to store the subscriber-specific settings.

8. A method for providing videoconferencing services using videoconferencing services switches adapted for deployment across a global Internet Protocol (IP) network, each videoconferencing services switch adapted to be linked to at least one other videoconferencing services switch, the method comprising:
    receiving endpoint registration and Session Initiation Protocol (SIP) call control data from call origination and destination IP videoconferencing endpoints in subscriber IP networks;
    establishing videoconferencing call connections for audio and video media exchange between the call origination and destination IP videoconferencing endpoints; and
    utilizing subscriber-specific settings to establish videoconferencing call connections.

9. The method of claim 8, further comprising, directing the videoconferencing calls from each of the endpoints to a closest global IP network access point.

10. The method of claim 8 wherein the subscriber-specific settings comprise subscriber-wide settings that apply to all calls from a subscriber and user-specific settings that apply to a particular endpoint of the subscriber.

11. The method of claim 8, further comprising, connecting at least one of the subscriber IP networks to the global IP network through a network address translation (NAT) device located in the subscriber IP network.

12. The method of claim 8, wherein the subscriber-specific settings comprise network address translation (NAT) settings.

13. The method of claim 8, further comprising, maintaining a repository of the subscriber-specific settings accessible to the videoconferencing services switch.

14. The method of claim 8, wherein the subscriber-specific settings are selected from the group consisting of: calling privileges, encryption, bandwidth, priority, participation, and audio/visual restriction policies.

15. A videoconferencing services switch adapted for deployment in a global Internet Protocol (IP) network and configured to communicate with at least one other videoconferencing services switch across the global IP network, the switch comprising:
    at least one processor; and
    a memory device having instructions stored thereon;
    wherein the switch is responsive to the instructions and configured to:

receive call control data from call origination and destination IP videoconferencing endpoints in subscriber IP networks; and establish videoconferencing call connections for audio and video media exchange between the call origination and destination IP videoconferencing endpoints according to subscriber-specific settings.

16. The videoconferencing services switch of claim 15, wherein the switch is configured to:

establish the videoconferencing call connections for encrypted audio and video media exchange between the call origination and destination IP videoconferencing endpoints.

17. The videoconferencing services switch of claim 15, wherein the subscriber-specific settings comprise subscriber-wide settings that apply to all calls from a subscriber and user-specific settings that apply to a particular endpoint of the subscriber.

18. The videoconferencing services switch of claim 15, wherein at least one of the subscriber IP networks is connected to the global IP network through a network address translation (NAT) device located in the subscriber IP network.

19. The videoconferencing services switch of claim 15, wherein the subscriber-specific settings comprise network address translation (NAT) settings.

20. The videoconferencing services switch of claim 15, wherein the videoconferencing services switch is capable of accessing the subscriber-specific settings.

21. The videoconferencing services switch of claim 15, further comprising a repository of the subscriber-specific settings.

22. A method for providing videoconferencing services using video conferencing services switches adapted for deployment across a global Internet Protocol (IP) network, comprising:

receiving call control data from call origination and destination IP videoconferencing endpoints in subscriber IP networks;

receiving real-time audio and video data streams from the call origination and destination videoconferencing endpoints in subscriber IP networks;

managing transfer of the real-time audio and video data streams between the videoconferencing service switches and subscriber IP networks; and utilizing subscriber-specific settings to establish a connection between the call origination and destination videoconferencing endpoints.

23. The method of claim 22, wherein the subscriber-specific settings comprise settings that apply to all calls.

24. The method of claim 22, wherein the subscriber-specific settings are globally configurable.

25. The method of claim 22, wherein the subscriber-specific settings comprise network address translation (NAT) settings.

26. The method of claim 22, further comprising, directing the videoconferencing calls from each of the endpoints to a closest global IP network access point.

27. The method of claim 22, further comprising, connecting at least one of the subscriber IP networks to the global IP network through a network address translation (NAT) device located in the subscriber IP network.

28. The method of claim 22, further comprising, maintaining a repository of the subscriber-specific settings accessible by the videoconferencing services switches.

29. The method of claim 22, wherein the subscriber-specific settings are selected from the group consisting of: calling privileges, encryption, bandwidth, priority, participation, and audio/visual restriction policies.

* * * * *